United States Patent [19]

Mancosu et al.

[11] Patent Number: 5,247,463
[45] Date of Patent: Sep. 21, 1993

[54] PROCESS AND APPARATUS FOR INSPECTING THE GEOMETRICAL CONFIGURATION OF TOOTHED DRIVING ELEMENTS

[75] Inventors: Federico Mancosu, Milan; Roberto Sgnaolin, Piovera; Roberto Zavaglio, Milan, all of Italy

[73] Assignee: Pirelli Prodotti Diversificati S.p.A., Milan, Italy

[21] Appl. No.: 793,729

[22] Filed: Nov. 21, 1991

[30] Foreign Application Priority Data

Nov. 21, 1991 [IT] Italy ............................. 22128 A/90

[51] Int. Cl.⁵ .................... G01B 1/00; G01M 13/00
[52] U.S. Cl. .............................. 364/560; 364/561;
    364/563; 364/473; 364/552; 73/146; 73/162
[58] Field of Search .............. 364/560, 561, 562, 563,
    364/552, 473; 73/162, 146; 33/501.8

[56] References Cited

U.S. PATENT DOCUMENTS

| 4,777,610 | 10/1988 | Barwick et al. ............ 364/563 |
| 4,852,402 | 8/1989 | Bertz ............................ 73/162 |
| 4,987,555 | 1/1991 | Twerdochlib ............... 364/561 |
| 5,060,173 | 10/1991 | Tsuji ........................ 364/551.01 |
| 5,136,527 | 8/1992 | Koretz ...................... 364/571.01 |

FOREIGN PATENT DOCUMENTS 263899 1/1989 Fed. Rep. of Germany .
2140183 2/1984 United Kingdom .

Primary Examiner—Jack B. Harvey
Assistant Examiner—Brian M. Buroker
Attorney, Agent, or Firm—Stevens, Davis, Miller & Mosher

[57] ABSTRACT

An apparatus and a method for inspection of the toothed configuration of an elastomeric tubular sleeve which will later be cut into short lengths to produce toothed driving belts. A tubular sleeve (2) having a toothed inner surface (2a) is operatively mounted around rollers (5, 6) operable in rotation to move the sleeve transversely to the direction of the teeth (3). A reading member (15) movable parallel to the rollers (5, 6) detects, through the repeated reading of the height of the toothed surface (2a) passing under a given read point, the transverse outline of the individual teeth (3), to enable comparison with geometric parameters stored in a processing unit (20). The translation speed of the sleeve (2) is identified by measuring the time necessary to the passage of two characteristic points of two contiguous teeth (3). Assigned to each height value detected by the reading member (15) is a corresponding distance value from one of the characteristic points of the teeth (3).

7 Claims, 3 Drawing Sheets

PROCESS AND APPARATUS FOR INSPECTING THE GEOMETRICAL CONFIGURATION OF TOOTHED DRIVING ELEMENTS

CROSS REFERENCE TO RELATED APPLICATIONS

Copending U.S. application Ser. No. 792,876, filed on even date herewith and corresponding to:

Italian Application 22 121 A/90, filed Nov. 21, 1990 for PROCESS AND APPARATUS TO APPLY IDENTIFICATION INSCRIPTIONS ON SLEEVES MADE OF ELASTOMERIC MATERIAL IN THE MANUFACTURE OF DRIVING BELTS (WAK 28335, case 9015).

Copending U.S. application Ser. No. 793,731, filed on even date herewith and corresponding to:

Italian Application 22 123 A/90, filed Nov. 21, 1990 for PROCESS AND APPARATUS FOR HANDLING DRIVING BELTS IN AN AUTOMATED MANNER (WAK 28349, case 9017).

Copending U.S. application Ser. No. 793,840, filed on even date herewith and corresponding to:

Italian Application 22 124 A/90, filed Nov. 21, 1990 for MACHINE AND PROCESS FOR COILING AND WINDING TUBULAR SLEEVES OF ELASTOMERIC MATERIAL INCORPORATING REINFORCING FIBERS (WAK 28350, case 9018).

Copending U.S. application Ser. No. 793,732, filed on even date herewith and corresponding to:

Italian Application 22 125 A/90, filed Nov. 21, 1990 for PROCESS AND APPARATUS FOR THE INSPECTING JUNCTIONS IN SLEEVE LINING FABRICS FOR THE MANUFACTURE OF TOOTHED BELTS (WAK 28717, case 9020).

Copending U.S. application Ser. No. 793,733, filed on even date herewith and corresponding to:

Italian Application 22 126 A/90, filed Nov. 21, 1990 for PROCESS AND APPARATUS TO IDENTIFY THE PRESENCE OF STRUCTURAL CAVITIES IN SLEEVES FOR THE MANUFACTURE OF DRIVING BELTS (WAK 28710, case 9021).

Copending U.S. application Ser. No. 793,880, filed on even date herewith and corresponding to:

Italian Application 22 127 A/90, filed Nov. 21, 1990 for PROCESS AND AUTOMATIC INSTALLATION FOR THE CONTROL OF THE QUALITY AND OF THE PRODUCTION OF TRANSMISSION BELTS (WAK 28352, case 9022).

The disclosure of each of the above identified U. S. and Italian Applications are hereby incorporated by reference.

BACKGROUND OF THE INVENTION

The present invention relates to a process and an apparatus for inspecting the geometrical configuration of toothed driving elements, said toothed elements being provided with at least a toothed surface having a plurality of shaped teeth disposed parallel to one another in side by side relation according to a predetermined spacing.

The invention is adapted to carry out quality control tests on toothed driving elements of different types, such as for example cogwheels, toothed belts, toothed belt pulleys, as well as to inspect the geometrical configuration of dies and molds used in the manufacture of belts.

In the course of the present description reference will be particularly made to the inspection to be carried out on a sleeve designed to be cut according to several circumferential lines so as to make a number of toothed belts. However the applicable field of the invention is not to be intended as limited by the described example.

It is known that toothed belts are obtained by a cutting operation according to several circumferential lines executed on a cylindrical tubular sleeve having a toothed inner surface.

This sleeve is produced by wrapping at least a textile reinforcement layer around a cylindrical grooved die negatively reproducing the toothing extension, on which a layer consisting of a helix-shaped cord made of inextensible material and one or more layers of elastomeric material are then superposed in succession.

The semi-finished product thus obtained is surrounded by a coating sheath made of rubber or similar material through which, during a vulcanization process in an autoclave, the transmission of centripetal compressive forces homogeneously distributed on the elastomeric material layers occurs.

Under this situation the elastomeric material is forcedly urged through the cord coils and presses the fabric against the grooves provided on the die thereby filling them and creating the inner toothing of the sleeve.

Usually before undergoing the circumferential cutting operation the sleeve is submitted to an inspection in order to verify the correct toothing conformation. At the present state of the art this inspection is merely based on the visual control of the toothing by an operator.

Therefore it can be easily deduced that these empirical control methods do not offer a sufficient assurance in that the identification of possible anomalies in the sleeve toothing depends to a great extent on the skill of the operator entrusted with the inspection and the care he puts in carrying out the operation.

Furthermore, the visual evaluation alone of the tooth conformation does not enable slight geometrical defects to be identified. These defects, even if on the order of some tenths to some hundredth of a millimeter, can impair the correct operation of the belts produced. In addition, it must be borne in mind that the control methodologies presently in use do not allow timely interventions in case geometrical anomalies occur as a result of a bad operation of the apparatuses used for wrapping the textile and elastomeric layers around the die, or during the vulcanization step.

SUMMARY OF THE INVENTION

The main object of the present invention is substantially to solve the problems of the known art, by a process and an apparatus enabling an accurate and reliable inspection of the toothing.

A further object of the invention is to provide a process and an apparatus capable of timely identifying and signalling the presence of geometrical anomalies in the toothing due to a bad operation of the apparatus adopted in the production processes for the manufacture of sleeves, so as to be able to intervene immediately and eliminate said anomalies.

The foregoing and further objects that will become more apparent in the course of the present description are substantially attained by a process for inspecting the geometrical configuration of toothed driving elements, characterized in that it comprises the following steps:

storing theoretical geometric parameters relating to the toothed surface of a toothed element being worked in an electronic data processing unit;

operatively mounting the toothed element on supporting and handling means;

moving the toothed element imparting a continuous translation to the toothed surface in a direction transverse to the extension of said teeth;

repeatedly reading the height of the toothed surface passing under a predetermined read point in order to identify the outline of the transverse extension of each tooth;

measuring the period of time elapsed between the different detections of height values carried out in the course of the repeated reading step;

identifying the passage under the read point of at least two characteristic points each belonging to the transverse profile of one of said teeth, said characteristic points being spaced apart from each other by a known amount previously input to the processing unit during the memorization step;

identifying the interval of time elapsing between the passage of said characteristic points under the read point, to which interval a displacement of the toothed surface equal to said known amount is correlated;

assigning a corresponding distance value from one of said characteristic points, to each height value detected in said reading step, based on the time intervening between the detection of the height value itself and the detection of the passage of said characteristic point, as well as on the value of the space-time ratio emerging from said identification step;

comparing said height values combined with the corresponding distance values, with the theoretical geometric parameters input to the processing unit during the memorization step;

signalling the discrepancies between the theoretical geometric parameters and the height values combined with the corresponding distance values.

In accordance with the invention, this process is put into practice by an apparatus for inspecting the geometrical configuration of toothed driving elements, characterized in that it comprises:

supporting and handling means designed to operatively engage the toothed element and give it a continuous movement in a transverse direction to the longitudinal extension of said teeth;

at least one reading member acting adjacent the toothed surface to detect the extension outline of each tooth through the repeated reading of the height of the toothed surface passing under a predetermined read point;

an electronic processing unit in which theoretical geometric parameters of the toothed surface are stored, which unit is operatively connected to the reading member to process the signals coming from said member and compare the received data with the theoretical geometric parameters.

BRIEF DESCRIPTION OF THE DRAWINGS

Further features and advantages will become more apparent from the detailed description of a preferred embodiment of a process and an apparatus for inspecting the geometrical configuration of toothed driving elements in accordance with the present invention, given hereinafter by way of non-limiting example with reference to the accompanying drawings, in which.

DETAILED DESCRIPTION OF A PREFERRED EMBODIMENT

Figure 1:
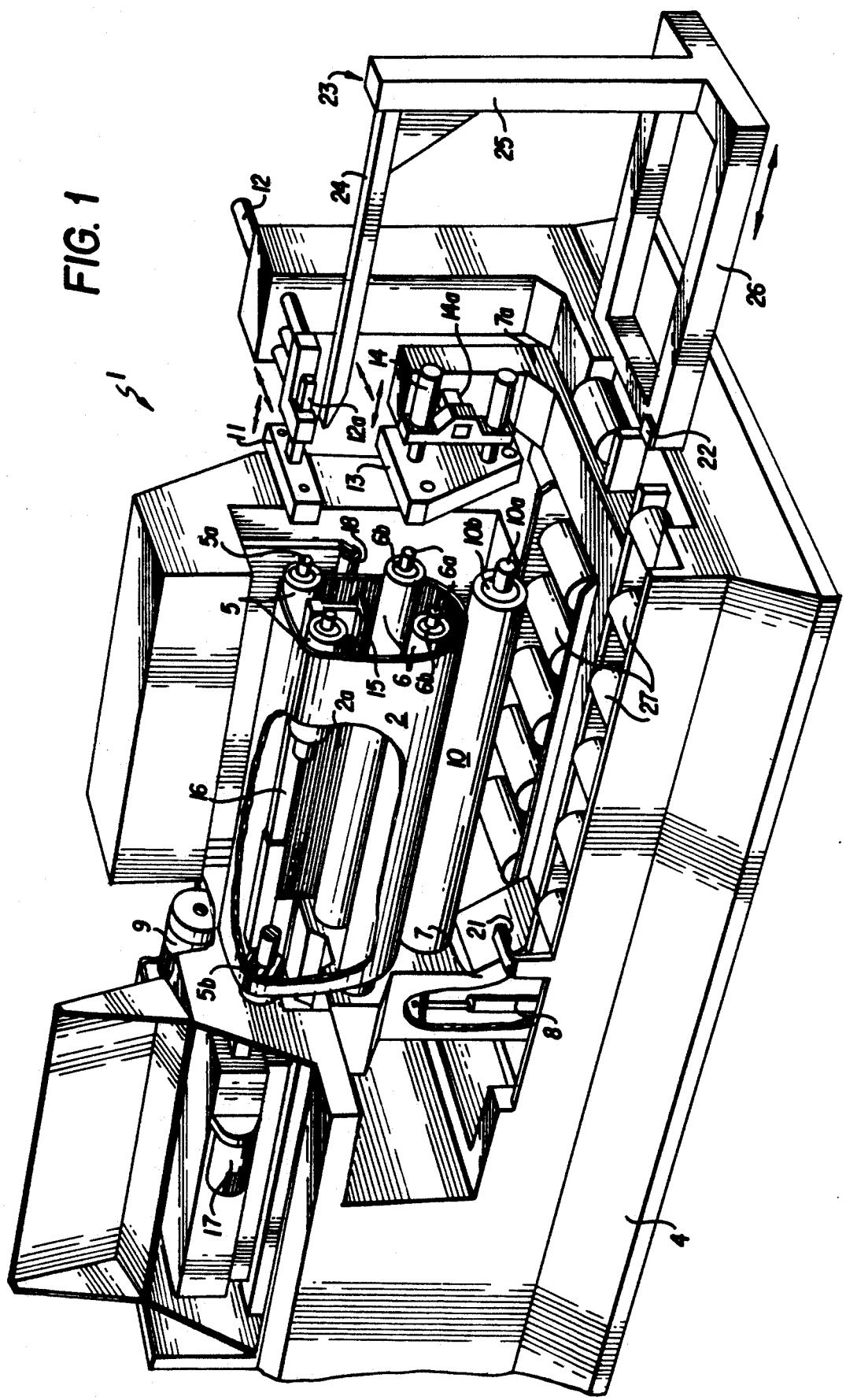
FIG. 1 is a perspective view of the apparatus used for putting the subject process into practice on toothed sleeves for the manufacture of toothed belts.

Referring to the drawings and in particular to FIG. 1, an apparatus for inspecting the geometrical configuration of toothed driving elements in accordance with the present invention has been generally identified by reference numeral 1.

Figure 2:
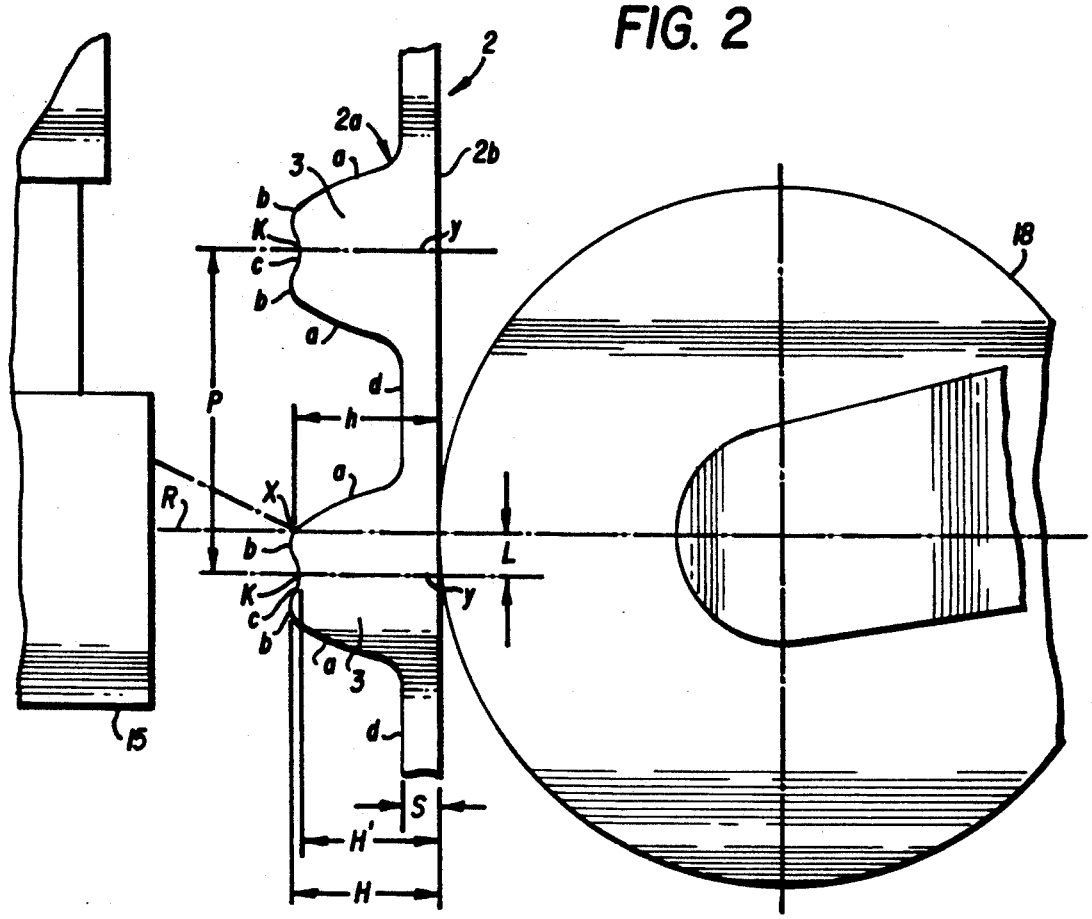
FIG. 2 is a diagrammatic side view of a detail of the apparatus to an enlarged scale, showing the conformation of the sleeve toothing and the action of the reading member designed to detect the transverse toothing outline.

Apparatus 1 is adapted to execute inspecting operations on any type of toothed element 2 provided with at least a toothed surface 2a having a plurality of shaped teeth 3 disposed parallel to one another in side by side relation according to a predetermined spacing "P", see FIG. 2.

In the embodiment herein described apparatus 1 is arranged to carry out inspection tests on toothed sleeves of the type used for the manufacture of toothed belts, as a result of cutting operations carried out according to several circumferential lines.

In accordance with the present invention, apparatus 1 puts into practice an inspection process essentially comprising the following steps:

storing theoretical geometric parameters relating to the toothed surface of a toothed element being worked in an electronic data processing unit;

operatively mounting the toothed element on supporting and handling means;

moving the toothed element imparting a continuous translation to the toothed surface in a direction transverse to the extension of said teeth;

repeatedly measuring the height of the toothed surface passing under a predetermined read point in order to identify the outline of the transverse extension of each tooth;

measuring the interval of time elapsed between the different detections of height values carried out in the course of the repeated reading step;

identifying the passage under the read point of at least two identical characteristic points each belonging to the transverse outline of one of said teeth, said characteristic points being spaced apart from each other by a known amount previously input to the processing unit during the memorization step;

identifying the interval of time elapsed between the passage of said characteristic points under the read point, to which interval a displacement of the toothed surface equal to said known amount is correlated;

assigning a corresponding distance value from one of said characteristic points, to each height value detected in said reading step, based on the time intervening from the detection of the height value itself to the detection of the passage of said characteristic point, as well as on the value of the space-time ratio emerging from said identification step;

comparing said height values combined with the corresponding distance values, with the theoretical geometric parameters input to the processing unit during the memorization step;

signalling the discrepancies between the theoretical geometric parameters and the height values combined with the corresponding distance values.

To this end, apparatus 1 is essentially comprised of a bed 4 on which is mounted supporting and driving means 5, 6 arranged to operatively bear the toothed element 2 and give it a continuous movement in a direction substantially perpendicular to the longitudinal extension of the teeth 3 provided thereon.

In the embodiment shown in which the test is carried out on said sleeves, the supporting and driving means consists of at least one upper roller 5 rotatably engaged to the bed 4 and at least one lower roller 6 parallel to the upper roller 5 and operatively engaged to a supporting column 7 movable upon command of fluid-operated actuators 8 or equivalent means, so as to cause the lower roller 6 to move close to and apart from the upper roller 5.

In greater detail, in the embodiment shown provision is made for two upper rollers 5, one of which is operable in rotation by a first motor 9, and two lower rollers 6, disposed in parallel and in side by side relation with respect to substantially horizontal planes.

In addition it is preferably provided that at least an auxiliary lower roller 10 disposed in parallel under the lower rollers 6 be connected to the supporting column 7. The auxiliary roller 10 is adapted to be used in place of the lower rollers 6 when the sleeves 2 being worked have a wide circumferential extension.

As shown in FIG. 1, each of the supporting rollers 5, 6, 10 should be provided with a coating layer made of elastomeric material 5b, 6b, 10b in order to ensure a firm grip on the toothed surface 2a and an easy adaptability to the different types of sleeves 2 being worked.

At least one of the ends 5a of each upper roller 5 can be operatively engaged by a first removable support 11 slidably guided relative to the bed 4 and laterally movable apart from the upper rollers 5, with two degrees of freedom upon command, for example, by fluid-operated cylinders 12 and 12A or the like, to enable the sleeve 2 to be engaged about the rollers, as diagrammetrically shown in FIG. 1.

In the same manner, at least one of the ends 6a, 10a of each of the lower rollers 6 and auxiliary roller 10 can be operatively engaged by a second removable support 13 connected with two degrees of freedom to a side extension 7a of the supporting column 7 and movable laterally apart from the lower rollers upon command, for example, by respective actuators 14 and 14A to enable support 13 to be similarly moved.

Apparatus 1 is provided with at least a reading member 15, preferably of the known laser beam type, fastened to one end of a telescopic bar 16 that can be extended for example upon command of a worm screw not shown in the figure, driven by a second motor 17 so as to impart a continuous movement to the reading member in a direction substantially parallel to the longitudinal extension of the teeth 3 disposed on the inner side of the sleeve 2.

A freely rotating locating roller 18 disposed in parallel to the movement direction of the reading member 15, acts on the outer surface 2b of the sleeve 2 so as to keep said surface to a predetermined distance from the reading member.

Preferably, the axis of the locating roller 18 is substantially in alignment, on a horizontal plane, with the reading member 15 and the distance thereof from the upper rollers 5 ranges between 20% and 50% of the distance value between the upper and lower rollers, 5 and 6.

Referring now to FIG. 2, the reading member 15, (not described in detail as it is known per se) when of the laser type, which is one of its embodiments, sends a light beam "R" to the toothed surface 2a of the sleeve 2 and, by picking up the reflected light from the surface struck thereby at a predetermined read point "X", is capable of emitting electric signals correlated to the distance between the reading member and the read point "X" struck by the light beam "R".

Figure 3:
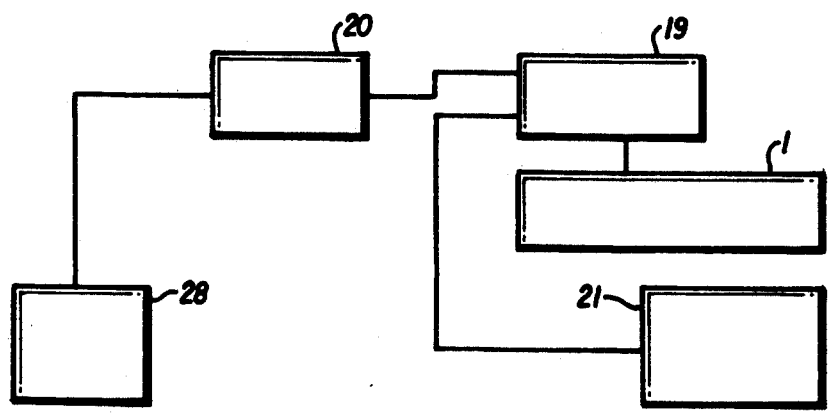
FIG. 3 is a block diagram showing the operating principle of the apparatus of the invention.

The reading member 15 is directly connected to a data processing unit 20. An electronic control box 19 (FIG. 3) in turn controls the operation of the different driving members (motors 9, 17, actuator cylinders 8, 12, 14, and so on) associated with apparatus 1.

The electronic control box 19 can also be replaced by an apparatus known as PLC (Logic Control Programmer) adapted to execute sequential operations, whereas the data processing unit 20 can also consist of an apparatus known as PC (Personal Computer) of high operating capabilities and adapted to make mathematical and statistical calculations.

The processing unit 20, following modalities to be better clarified in the following, processes the signals received from the reading member 15 and draws data relating to the geometrical configuration of the toothed surface 2a therefrom. In addition the processing unit 20 compares said data with the theoretical geometric parameters previously stored in the control unit itself.

Input to the memory of the processing unit 20 are the theoretical geometric parameters corresponding to the toothed surfaces 2a of different types of sleeves 2 produced in the factory in which the apparatus 1 is installed. The toothed surfaces 2a of the different sleeve types are differentiated from one another from different points of view, for example the distribution spacing "P" of the teeth 3, the maximum height "H" of the individual teeth, the thickness "S" of the sleeve 2 at the so-called bottom line "d" defining the tooth space between two contiguous teeth 3, as well as the transverse outline of the teeth themselves.

The teeth can have variable heights from one sleeve to another, for example in the range of 2 to 3.5 mm and the spacing "P" could be included between 2 and 14 mm.

In particular, the transverse outline can take many shapes, it can be for example in the form of a trapeze with the flanks "a" that are rectilinear or curved according to an arc of a circle, an ellipse and/or a parabola.

In the embodiment shown by way of example the transverse outline of the teeth 3 corresponds to the description given in the U.S. Pat. No. 4,850,943, the disclosure of which is hereby incorporated by reference. The fundamental features of said outline can be identified in the presence of two flanks "a" in the form of an arc of a parabola connected, at the lower part thereof, to the bottom line "d" and, at the upper part thereof, to two rounded apices between which an arched recess "c" coincident with the center line "y" of the tooth 3 is defined.

In addition, for each code corresponding to a sleeve to be controlled, data relating to the rotational speed of the sleeve and translation speed of the reading member 15 are input to the unit 20.

Said data are communicated to the electronic control box 20 that will create in apparatus 1 the conditions for establishing the pitch "z" to be given to the reading point "x".

In the unit 20 there are also data relating to the extension of the sleeve; these data transmitted to the control box 19 enable the machine to be arranged so that the sleeve may receive the appropriate tensioning.

Preferably, an individual code is assigned to the theoretical geometric parameters of each type of toothed surface 2a, which will enable the immediate selective recalling of said parameters for comparing them with data resulting from the reading carried out by the reading member 15.

The individual code corresponding to the sleeve 2 being tested is detected by the electronic control box 19 when the sleeve is fitted on rollers 5, 6. To this end an automatic read and record head 21 is conventionally interlocked to the electronic box 19, which head is designed to detect the information recorded in a corresponding proper card 22 associated with a handling support 23 conventionally used to transport the sleeves 2 and the belts subsequently produced between the various work stations inside the factory.

In a preferential embodiment the head 21 is of the magnetic type as well as the card 22.

The above handling support 23 holds the sleeve 2 by means of a bar 24 fastened in cantilevered fashion to a post 25 standing up from a base framework 26.

The handling support 23 lends itself to be operatively engaged along a roller-bed 27 mounted to the lower part of the apparatus bed 4, in order to fit the sleeve 3 on the rollers 5, 6 located close to each other, while the magnetic card 22 is simultaneously brought under the read head 21.

In this situation, the electronic control box 19 can transmit the individual code recorded in the magnetic card 22 carried by the handling support 23, to the processing unit 20.

The sleeve 2 is laid on the upper rollers 5, for example by lowering the roller-bed 27, then the handling support 23 is unthreaded from the sleeve, as shown in FIG. 1, to enable the removable supports 11, 13 to operatively engage with the ends 5a, 6a, 10a of the upper and lower rollers 5 and 6, 10.

Meanwhile, the processing unit has found in its memory the theoretical geometric parameters corresponding to the individual code signalled to it. Therefore the processing unit 20 activates the electronic control box 19 that causes the lowering of the lower rollers 6, 10 to an extent sufficient to produce a given tensioning of the sleeve 2.

At the end of the lowering an inspection step can be provided, through measuring means associated with the supporting column 7, in order to verify whether the carried out positioning of the lower rollers 6, 10 corresponds to the expected tensioning of sleeve 2.

At this point, apparatus 1 begins the process for inspecting the geometrical features of the toothed surface 2a, said process, in accordance with the present invention, following the modalities set forth hereinafter.

The processing unit 20 enables the electronic control box 19 to actuate the first motor 9 which, through the upper rollers 5, causes the movement of the sleeve 2 in a direction transverse to the extension of the teeth 3.

Simultaneously, the second motor 17 is actuated as well, and it causes the translation of the reading member 15 in a direction substantially parallel to the longitudinal extension of the teeth 5.

Preferably the starting point of the reading member motion is located laterally apart from the sleeve 2, so that the movement speeds of the sleeve and the reading member may have the possibility of stabilizing before the reading of the toothed surface 2a really begins.

Figure 4:
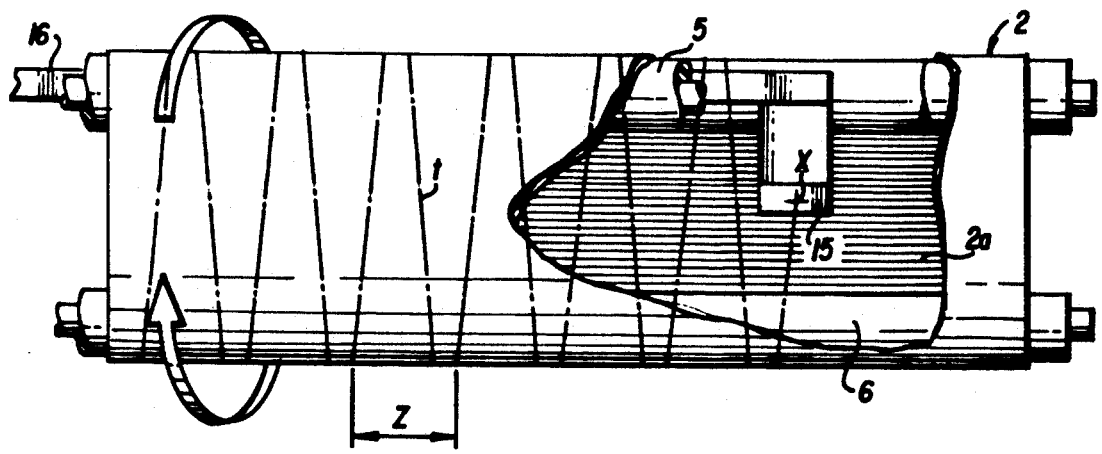
FIG. 4 is a fragmentary diagrammatic view showing the path of the relative motion between the reading member and the sleeve.

When the reading member 15 moves within the sleeve 2, the reading point "X" where the repeated detection of the height "h" of the toothed surface 2a occurs is moved relative to the toothed surface following a substantially helical path "t" (FIG. 4) the pitch "z" of which is correlated with the ratio existing between the translation speed of the reading member and the rotational speed of the sleeve.

By adjusting these speeds it is possible to obtain a helical path "t" having the desired pitch "z". The more the pitch "z" of path "t" is reduced, the more closely the inspection test is carried out.

A satisfactorily close inspection is achieved when the pitch "z" of the helical path is lower than or equal to the width of the belts to be produced. In this way, in fact one can be sure that all teeth 3 belonging to each of the belts to be obtained will pass before the reading point "X" in order to be submitted to the inspection test.

Based on the signals coming from the reading member 15, the processing unit 20 carries out the reading of the toothed surface 2a by means of repeated detections of the height "h" exhibited, instant by instant, by the toothed surface itself at the reading point "X".

In this manner, the processing unit is capable of identifying the transverse outline of each tooth 3 passing before the reading point "X".

However, in order to be able to carry out a direct comparison between data detected on the reading and the previously stored theoretical geometric parameters of the toothing 2a, it is necessary for the processing unit 20 to know the exact position of the reading point "X" on the outline of the tooth 3 at the moment that the height value "h" of the toothed surface 2a is detected. In order to supply the processing unit 20 with this information, the process in accordance with the invention detects the relative speed between the toothed surface 2a and the reading point "X" in a direction perpendicular to the longitudinal extension of the teeth 3, so that, based on the value of the obtained space/time ratio, the distance "L" of the reading point "X" from a predetermined reference point "K" on the outline of the transverse tooth extension may be recognized at a given instant. .

In greater detail, it has been provided that during the reading step a measuring of the time intervening between the different detections of the height values "h" should be carried out by the processing unit 20.

The processing unit 20 also performs the identification of the passage under the reading point "X" of two identical characteristic points "K" each belonging to the transverse outline of one of the teeth 3.

These characteristic points "K" that in the described example are constituted by the base of the recess "c" having a predetermined height "H", are unmistakably spaced apart from each other by a known amount previously stored in the processing unit 20, which amount is preferably the same as the spacing "P" of teeth 3.

By identifying the interval of time intervening between the passage of the two characteristic points "K", the processing unit 20 is therefore capable of establishing the desired space/time ratio. For the sake of clarity, it is pointed out that the identification of the interval of time intervening between the passage of the characteristic points "K" can be initially done on the first belt of the sleeve and repeated twice or three times consecutively, each referred to two different teeth 3, as far as the processing unit 20 finds a constant time value between one measuring and the next one for a predetermined number of times.

It is also provided that said operating step for detecting the space/time ratio should be executed several times at predetermined intervals during the inspection test on the sleeve 2 In this way one can be sure that the test result is not impaired by possible variations in the relative speed between the toothed surface 2a and the reading point "X" as a result for example of uncontrolled variations in the driving speed of the first and/or second motor 9, 17, slight elastic deformations of the sleeve 2 and/or the elastomeric coating layers 5b, 6b disposed on the rollers 5, 6 or an imperfect parallelism between the individual teeth 3 and the movement direction of the reading member 15.

Based on the value of the detected space/time ratio, the processing unit 20 is capable of assigning to each height value "h" detected in the reading step, a corresponding distance value "L" from any of the characteristic points "K", so as to go back to the precise configuration of the transverse-extension outline of each tooth 3, adapted to be compared with the previously stored theoretical geometric parameters.

When a discrepancy is detected between the transverse outline of a tooth 3 and the theoretical geometric parameters, the processing unit 20 identifies which of the belts, to be later produced by a cutting operation of the sleeve 2 will have a defective tooth 3.

For the purpose the processing unit 20 must for example know the width of the single belts to be produced and be able to carry out the above operation based on the movement speed of the reading member 15 and the interval of time elapsed from the moment that the reading step has started to the moment the discrepancy is detected.

During the test all discrepancies and the position of the belts corresponding thereto are stored by the processing unit 20.

When, at the end of the test, the handling support 23 will be engaged again on the roller-bed 27 in order to pick up the sleeve 2, the processing unit 20 will send signals relating to the position of the discrepancies detected during the test to the magnetic card 22, through the electronic control box 19 and the magnetic head 21.

Signals input to the magnetic card 22 will enable other automatic machines provided in the belt production cycle to identify which of the belts obtained later through a cutting operation of the sleeve will have defective teeth.

Advantageously, the process in accordance with the invention allows not only possible defects of the teeth to be identified, but also the cause of the defects, so as to be able to carry out a timely intervention for the appropriate corrections.

For the purpose, the processing unit is provided to be able to classify many types of defects that can be found in the teeth and transmit all data detected during the test to a processor 28 and/or transmit said data to the magnetic card 20 so that more accurate controls may be made on the sleeve in a following specific station for final inspection.

Based on the type of defect found, the processor supervising the operation of the main apparatuses used in the belt production cycle will signal the operating anomaly of the apparatus or apparatuses in which the defect is supposed to have had origin.

It is also possible to input all data referred to the inspected sleeves to the processor 28 as transmitted from unit 20, so that after a long interval of time it will be possible to reconstruct the "history" of the production process of a given belt.

FIGS. 5 to 10 show different types of defects that can be found during the test. In said figures shown in dotted line is the theoretical outline that a tooth 3 should have.

Figure 5:
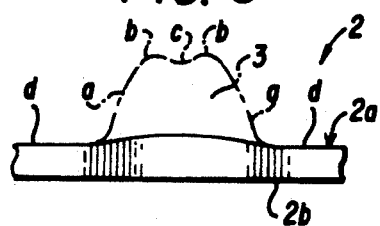
FIGS. 5 to 10 show, by way of example only, some typical defects that can be found in the sleeve toothing.

In detail, FIG. 5 shows the appearance of the toothed surface when a tooth 3 is almost completely lacking. This defect is usually caused by an insufficient steam pressure within the autoclave in which the vulcanization of the sleeve and the simultaneous molding of the teeth has occurred.

Figure 6:
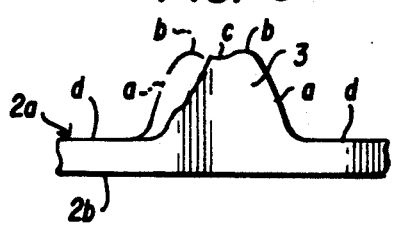

Shown in FIG. 6 is the outline of a tooth 3 devoid of a side portion thereof. This defect is normally caused by the presence of machining allowance in the region of the die grooves.

Figure 7:
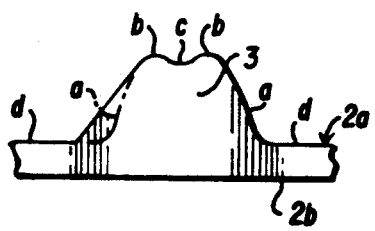

The defect shown in FIG. 7 consists in an excess of elastomeric material on one of the tooth flanks "a". It is the result of the absence of a metal part on the die.

Figure 8:
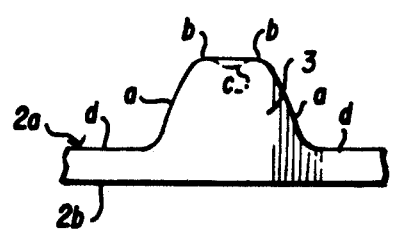

The absence of said metal part on the die also gives rise to the defect shown in FIG. 8 consisting of the absence of the rounded recess "C" on top of the tooth 3.

Figure 9:
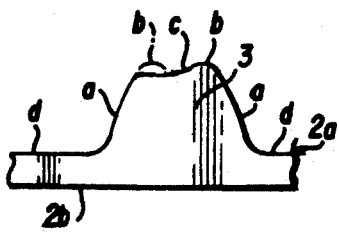

The tooth shown in FIG. 9 is devoid of one of the rounded top apices "b". This may be due to machining allowance inside the die, or to the presence of air bubbles or other impurities during the vulcanization.

Figure 10:
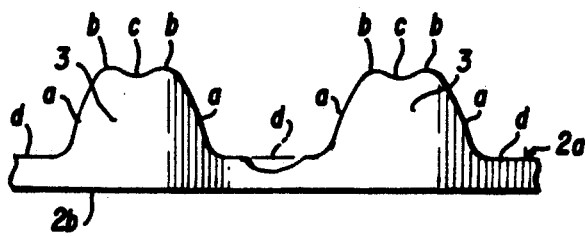

Also the defect shown in FIG. 10 consisting in lack of elastomeric material at the bottom line "d" of the toothed surface 2a, can be ascribed to machining allowance or to the presence of other impurities in the die.

The present invention attains the intended purposes. The process and apparatus in question enable inspection tests to be carried out in a very reliable and accurate manner.

In this connection it is to be noted that by the present defects on the toothing even apparatus it is possible to detect on the order of some hundredths of a millimeter.

In addition, the inventive process and apparatus permit suitable and timely interventions on the machines and production processes in which the causes of the defects found in the toothed surface reside. In fact, the process allows a great number of sleeves to be inspected, each sleeve only taking a few minutes for the inspection.

It is obviously understood that modifications and variations can be made to the invention as conceived, all of them falling within the scope of the inventive idea as defined by the claims hereof.

We claim:

1. A process for inspecting the geometrical configuration of toothed driving elements, said toothed elements being provided with at lest a toothed surface having a plurality of shaped teeth disposed parallel to one another according to a longitudinal extending direction of said shaped teeth, said shaped teeth being positioned in side by side relation according to a predetermined spacing "P", said process comprising the following steps:

a) storing in an electronic data processing unit theoretical geometric parameters relating to the desired toothed surface of a toothed element;
b) operatively mounting the toothed element having the toothed surface on supporting and handling means;
c) moving the toothed element by imparting a continuous translation to the toothed surface in a direction perpendicular to said longitudinal extending direction of the shaped teeth;
d) repeatedly reading the height h of the toothed surface passing under a predetermined read point X in order to identify the outline of a transverse section of each tooth;
e) measuring the period of time elapsing between the different detections of the height values h carried out in the course of the repeated reading step;
f) identifying the passage under the read point X of at least two identical characteristic points K of the outline of the transverse section of one of said teeth, said characteristic points K being spaced apart from each other by a predetermined distance which was previously input to the processing unit during the storing step;
g) identifying the interval of time elapsing between the passage of said characteristic points K under the read point X, a displacement of the toothed surface equal to said predetermined distance being correlated to said interval of time;
h) assigning a corresponding distance value L from one of said characteristic points K, to each height value h detected in said reading step, based on the time intervening from the detection of the height value to the detection of the passage of said characteristic point K as well as on the value of the space-time ratio emerging in said identification step;
i) comparing said height values h combined with the corresponding distance values L, with the desired theoretical geometric parameters input to the processing unit during the storing step; and
signalling any discrepancies between the desired theoretical geometric parameters and the height values h combined with the corresponding distance values L.

2. A process according to claim 1 in which said predetermined distance corresponds to the spacing P of the teeth.

3. A process according to claim 1 further comprising the step of displacing the read point X along the longitudinal extending direction of said shaped teeth during the repeated reading step.

4. A process according to claim 1 in which in said storing step the theoretical geometric parameters corresponding to several different toothed elements are input to the processing unit, which parameters can be selectively recalled when a corresponding toothed element is being operatively mounted.

5. A process according to claim 1 in which said steps of identifying the passage of the two characteristic points K and of identifying the interval of time elapsing between the passage of said points K are carried out several times consecutively as far as the detected interval of time is the same for a predetermined number of consecutive identifications.

6. A process according to claims 1 in which an outer surface of the toothed element is acted upon by at least a locating roller in order to keep said outer surface apart from the reading member by a predetermined distance.

7. A process for inspecting the geometrical configuration of a toothed sleeve for the manufacture of toothed belts, said toothed sleeve being provided with at least a toothed surface having a plurality of shaped teeth disposed parallel to one another according to a longitudinal direction, said shaped teeth being positioned in side by side relation according to a predetermined spacing "P", said process comprising the following steps:
a) storing theoretical geometric parameters relating to the toothed surface of a tubular toothed sleeve being worked in an electronic data processing unit;
b) operatively mounting the toothed sleeve on at least two supporting rollers having parallel axes;
c) tensioning the sleeve between the rollers;
d) moving the sleeve by driving said rollers in rotation to impart a continuous translation to the toothed surface in a direction perpendicular to said longitudinal extending direction of the shaped teeth;
e) repeatedly reading the height h of the toothed surface passing under a predetermined read point X in order to identify the outline of the section extension of each tooth;
f) measuring the period of time elapsing between different directions of the height values h carried out in the course of the repeated reading step;
g) identifying the passage under the read point X of at least two characteristic points K each belonging to the transverse outline of the transverse section of one of said teeth, said characteristic points K being spaced apart from each other by a predetermined distance previously input to the processing unit during said storing step;
h) identifying the interval of time elapsing between the passage of said characteristic points K under the read point X, a displacement of the toothed surface equal to said predetermined distance being correlated to said interval of time;
i) assigning a corresponding distance value L from one of said characteristic points K, to each height value h detected in said reading step, based on the time intervening from the direction of the height value to the detection of the passage of said characteristic point K, as well as on the value of the space-time ratio emerging in said identification stèp;
j) comparing said height values h combined with the corresponding distance values L, with the theoretical geometric parameters input to the process in unit during the storing step; and
k) signalling any discrepancies between the theoretical geometric parameters and the height values h combined with the corresponding distance values L.

* * * * *